(12) United States Patent
Gill et al.

(10) Patent No.: US 12,131,146 B2
(45) Date of Patent: Oct. 29, 2024

(54) MAINTENANCE TIME WINDOW PREDICTION FOR INSTALLING UPDATES TO A COMPUTE NODE

(71) Applicant: HEWLETT PACKARD ENTERPRISE DEVELOPMENT LP, Spring, TX (US)

(72) Inventors: Mantej Singh Gill, New Delhi (IN); Dhamodhran Sathyanarayanamurthy, Bangalore Karnataka (IN); Arun Mahendran, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 144 days.

(21) Appl. No.: 18/146,096

(22) Filed: Dec. 23, 2022

(65) Prior Publication Data

US 2024/0211234 A1   Jun. 27, 2024

(51) Int. Cl.
*G06F 8/65* (2018.01)
(52) U.S. Cl.
CPC ..................... *G06F 8/65* (2013.01)
(58) Field of Classification Search
None
See application file for complete search history.

(56) References Cited

U.S. PATENT DOCUMENTS

| | | | |
|---|---|---|---|
| 5,910,987 A | 6/1999 | Ginter et al. | |
| 6,732,053 B1 | 5/2004 | Aragona | |
| 7,120,800 B2 | 10/2006 | Ginter et al. | |
| 7,752,466 B2 | 7/2010 | Ginter et al. | |
| 7,831,823 B2 | 11/2010 | Ginter et al. | |
| 8,131,659 B2 | 3/2012 | Xu et al. | |
| 8,619,643 B2 | 12/2013 | Alizadeh-Shabdiz et al. | |
| 10,868,893 B2 | 12/2020 | Pope et al. | |
| 10,999,303 B2 | 5/2021 | Pope et al. | |
| 2005/0203968 A1* | 9/2005 | Dehghan | G06F 8/65 707/999.203 |
| 2005/0228798 A1* | 10/2005 | Shepard | H04L 67/34 |
| 2013/0103642 A1* | 4/2013 | Zhang | G06F 16/24568 707/609 |
| 2017/0262275 A1* | 9/2017 | Mohiuddin | G06N 20/00 |
| 2018/0046926 A1* | 2/2018 | Achin | G06F 9/5011 |
| 2020/0026710 A1 | 1/2020 | Przada et al. | |
| 2021/0004000 A1* | 1/2021 | Kalaskar | G06F 9/45545 |

(Continued)

OTHER PUBLICATIONS

Scikit Learn, "Gradient Boosting regression", retrieved from: https://scikit-learn.org/stable/auto_examples/ensemble/plot_gradient_boosting_regression.html, retrieved on: Jan. 20, 2023, pp. 3.

*Primary Examiner* — Qing Chen
(74) *Attorney, Agent, or Firm* — Jones Robb PLLC (57) ABSTRACT

A device and corresponding method are provided to provide accurate estimates of how long it will take to install updates to compute nodes in a large-scale computer deployment. a duration prediction model is trained using historical data from previous updates to compute nodes. The features selected to train the duration prediction model are update features including update component type, update component size, update component duration and compute node features including operating system, BMC type/version, UEFI type/version, and generation for each of the compute nodes updated. The historical data for the features is accessed from a metadata store.

20 Claims, 7 Drawing Sheets

(56) References Cited

U.S. PATENT DOCUMENTS

| | | | |
|---|---|---|---|
| 2021/0132936 A1* | 5/2021 | Arakkal | G06N 7/01 |
| 2022/0075613 A1* | 3/2022 | Ramachandran | G06F 9/45558 |
| 2022/0350588 A1* | 11/2022 | Liao | G06N 3/08 |

* cited by examiner

| Component | Component Size | BMC | BMC Version | UEFI Version | Compute Node Generation | Target device count | Runtime Agent Performs Update | UEFI Performs Update | BMC Performs Update | Component Install Time in Seconds | Node OS is Linux | Node OS is Window |
|---|---|---|---|---|---|---|---|---|---|---|---|---|
| 0 | 33870913.0 | 5.0 | 2.14 | 2.30 | 10.0 | 1.0 | 1 | 0 | 0 | 190.0 | 1 | 0 |
| 2 | 7000000.0 | 5.0 | 2.14 | 2.30 | 10.0 | 1.0 | 1 | 0 | 0 | 1.0 | 1 | 0 |
| 3 | 11000000.0 | 5.0 | 2.14 | 2.30 | 10.0 | 1.0 | 1 | 0 | 0 | 1.0 | 1 | 0 |
| 4 | 2000000.0 | 5.0 | 2.14 | 2.30 | 10.0 | 1.0 | 1 | 0 | 0 | 4.0 | 1 | 0 |
| 7 | 614648.0 | 5.0 | 2.30 | 2.34 | 10.0 | 1.0 | 1 | 0 | 0 | 2.0 | 0 | 1 |

FIG. 7

MAINTENANCE TIME WINDOW PREDICTION FOR INSTALLING UPDATES TO A COMPUTE NODE

INTRODUCTION

Large scale deployments of computers, such as those that may be found in a data center, enterprise, campus, government facility, etc., may comprise many compute nodes (computer servers) for storing and processing data. Each compute node has a computer processor, other hardware components (e.g., storage media), and software components (e.g., firmware, drivers, operating system, and other system software). Each compute node has a baseboard management controller (BMC). A BMC is a specialized processor used for remotely monitoring and managing compute nodes. A BMC monitors the physical state of the compute node. Corrective actions and updates can be made remotely through an administrative management application in communication with the BMC. In addition to monitoring, compute nodes may be updated using the BMC.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

When updates are made to the compute nodes of a large-scale computer deployment, such as updates to the various software components thereof, the administrative management application allows for such updates to be remotely installed and the updates are monitored by the BMC of each compute node. While the updates are being installed, the compute nodes and/or their components are generally not available to be used for other purposes, and thus an administrator may desire to schedule the updates at times for which it is acceptable for the compute nodes to be unavailable so as to minimize the impact of the update.

To facilitate scheduling of the updates in a way that minimizes impact, it may help to know how long the updates will take. But currently there is no way to accurately predict how long it will take to remotely install updates to the compute nodes and how long all or a portion of compute nodes in a large-scale computer deployment will be unavailable due to installation of updates. Traditionally, update durations were manually estimated by administrators, for example based on recalling the length of installing previous updates. However, such manual estimation is inherently inaccurate. There is a need to accurately predict the length of time needed to complete installation of multiple updates in a large-scale computer deployment. Without accurate estimates, it is difficult to schedule when to update compute nodes in the large-scale computer deployment and can leave compute nodes unavailable for their intended purpose of processing and storing data.

To provide accurate estimates of how long it will take to install updates to compute nodes in a large-scale computer deployment, examples disclosed herein provide a duration prediction model that is trained using historical data from previous updates to compute nodes. More specifically, a set of features is selected to train the duration prediction model, including update features that relate to attributes of the previous updates and compute node features that relate to attributes of the compute nodes upon which the previous updates were installed. The update features may include update component type (described below) (update component referring to a portion of the overall update, such as an individual software update), update component size, and update component duration (e.g., how long the update took to install). The compute node features may include the operating system of each compute node, the BMC type/version of each compute node, the Unified Extensible Firmware Interface (UEFI) type/version of each compute node, generation, and number of devices undergoing an update for update component for each of the compute nodes updated. The historical data for the features is accessed from a metadata store. The trained duration prediction model comprises a function that relates input variables corresponding to the aforementioned features to an output variable corresponding to an estimated duration for an update (the amount of time the update is estimated to take).

For example, in some implementations the duration prediction model may be a machine learning regression algorithm, such as an XGBRegressor algorithm. XGB Regressor is a scalable, distributed gradient-boosted decision tree machine learning library. It provides parallel tree boosting and is used for regression, classification, and ranking problems. XGBRegressor is a supervised learning algorithm, which predicts a target variable by combining the estimates of a set of simpler, weaker models. In some examples, the XGBRegressor algorithm may be used both for feature selection and training. That is, during training, an initial set of features may be narrowed down by excluding features whose relevance is low, as indicated by initial outputs of the XGBRegressor algorithm. Repeated k-fold cross-validation may be used to improve the estimated performance of the machine learning model. For example, in some training examples a Mean Absolute deployment time error of approximately 12 seconds (or about 15%) was obtained across 1800 updates. Other example regression models that may be used include multiple linear regression, polynomial regression, robust regression, decision tree, random forest, Gaussian process regression, support vector regression and combinations thereof.

When new update components are to be deployed to compute nodes in a large-scale computer deployment, deployment time is predicted by the trained duration prediction model for each update component and compute node to be updated by feeding data characterizing the attributes of the new update component and the attributes of the compute nodes to the model as independent variable inputs and calculating an estimated duration based on those inputs. As multiple update components are often deployed as an update package, the duration prediction model determines a predicted duration for each of the multiple update components.

To initiate the estimation, the administrative management application may make a representational state transfer (REST) application programming interface (API) call to the system comprising the model. The payload of the REST API call includes metadata for the update component type and update component size for each update component to be installed, and also information specifying the type of device being updated. From this information, the attributes of the updates and compute nodes to be updated may be determined. For example, the attributes of the compute nodes to be updated may be determined by accessing compute node data from the metadata store (e.g., searching the metadata store for compute node data corresponding to the type of device being updated as specified in the information from the REST API call). The number of devices to be updated for each update component is also determined. The update metadata for the payload of the REST API for each update component and compute node metadata from the metadata store for each compute node to be updated are loaded into the trained duration prediction model to generate a predicted update duration for each update component.

The predicted durations are summed up to calculate an aggregated predicted duration (deployment time) for installation of the multiple update components. The aggregated predicted duration is the total predicted maintenance time window for completing installation of the upgrade components. The aggregated predicted duration is formatted to be returned to the administrative management application in response to receiving the application call from the administrative management application.

Using the request headers from the REST API call, the system generates and formats the aggregated predicted duration and returns the data to the administrative management application. The administrative management application may then communicate the aggregated predicted duration to a user thereof to aid the user in determining if and when to begin remote installation of the update package for the compute nodes to be updated in the large-scale computer deployment. For example, the administrative management application may display the aggregated predicted duration along with information about the update and a selectable interface (e.g., a button or other GUI input) that the user can select to initiate or schedule the update. Alternatively, the administrative management application may use scheduling logic programmed into the administrative management application to determine a timing for the update, based on the aggregated predicted duration. For example, the scheduling logic may identify time windows that satisfy predefined criteria for being acceptable for performing updates (e.g., nights, weekends, holidays, other times of relatively lower usage of the compute nodes, user-specified time windows, or any other defined time windows) and select from these acceptable time windows at least one time window that is equal to or larger in duration than the aggregated predicted duration. The administrative management application may then either schedule the update for the selected time window automatically (i.e., without user intervention) or provide the selected time window(s) to the user as a suggestion that the user can accept (thereby causing the administrative management application to schedule the update for the selected time window) or reject (in which case the user can chose some other time window). In each of the above examples, the aggregated predicted duration allows for the scheduling of the update at timings that have reduced impact on the organization due to the compute node downtime associated with the update.

The metadata store may be maintained by the administrative management application or may be maintained separately. The metadata store comprises historical update metadata (corresponding to the updated features described above) and historical compute node metadata (corresponding to the compute node features described above). The historical update metadata and historical compute node metadata include features and information linked to historical deployments of updates to firmware and software.

When a compute node is updated, the metadata store maintains historical update data for each compute node updated, such as update component type, update component size, update component duration and type of device updated. The update component type is information about how the update component is installed, such as whether the update component installation is performed by a runtime agent, the BMC, or software interface. The type of device being updated may be, for example, a disk drive, a solid-state drive (SSD), a PCI card, a network card (NIC), an expander, or other type of device. The update component type, type of device updated, and update component size may be parsed from metadata of the update component and stored in the metadata store. The metadata store receives a log (e.g., time series data) from the BMC of the time installation of an update component was initiated and when it was completed (update duration). The metadata store maintains the update duration as historical update data.

The metadata store maintains historical compute node metadata including operating system, BMC (type/version), software interface between the operating system and firmware, generation for each compute node. The operating system may be, for example, Linux, Windows, or a virtual operating system, or other operating systems.

Turning now to the figures, various devices, systems, and methods in accordance with aspects of the present disclosure will be described.

Figure 1:
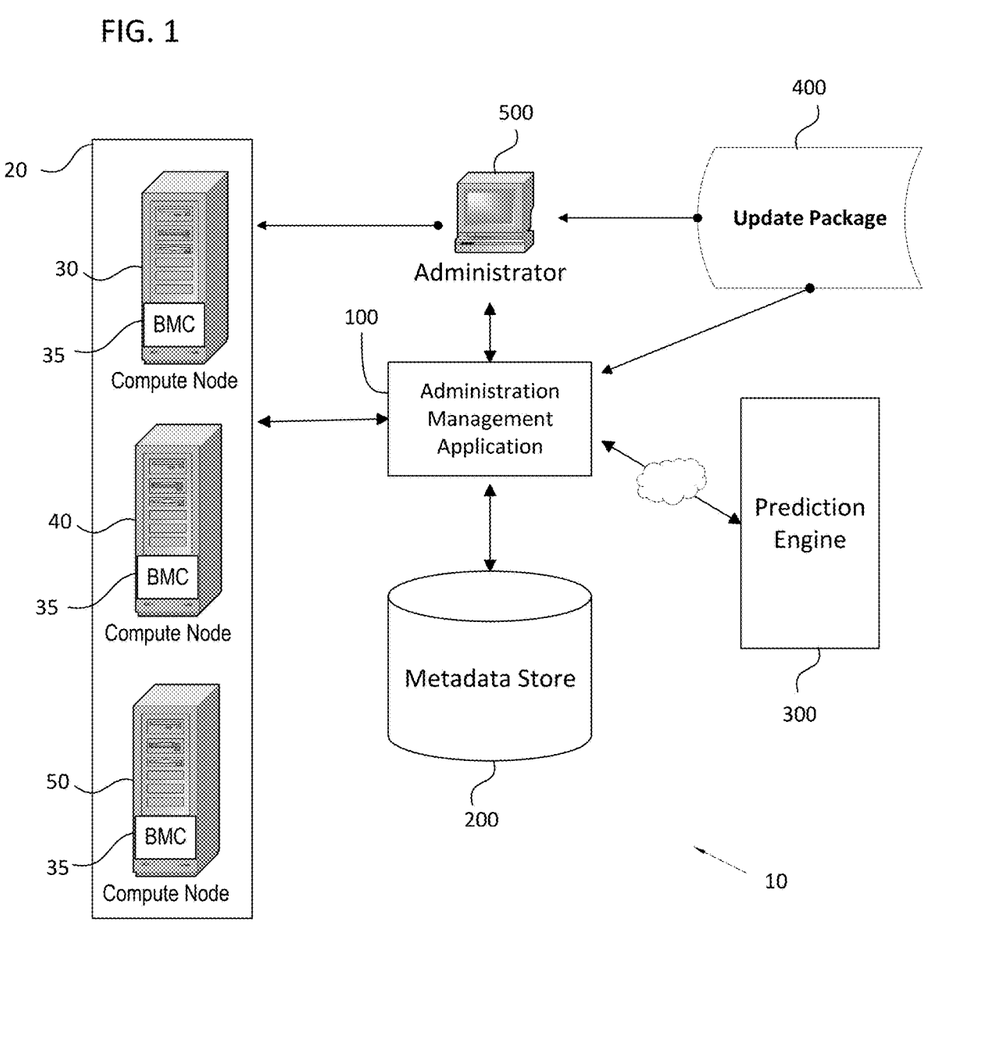
FIG. 1 is a block diagram illustrating a computing system in accordance with examples set forth herein.

FIG. 1 is a system 10 illustrating networked compute nodes 20, an administrative management application 100, metadata store 200, a prediction engine 300, an update package 400 and network administrator 500.

Networked compute nodes 20 are a group of compute nodes (servers) that are connected internally to store, transfer, and access digital information. Exemplary groups of compute nodes 20 may be large data centers or a smaller server closet or room. Each compute node 30, 40, and 50 has a processor and memory. A compute node may also comprise a number of devices in addition to the processor and memory, such as a disc drive, a solid-state drive (SSD), a PCI card, a network card (NIC), an expander, or other type of device. Although three example compute nodes are illustrated, any number of compute nodes may make up a group of networked compute nodes 20.

The group of compute nodes 20 is connected via any type of networking technology using any desired communication protocol and in any desired network topology. For example, the compute nodes may be connected via a local area network (LAN), WLAN or SD-WAN, creating a private network that links compute nodes 30, 40 and 50.

The network may be connected by cables or wireless technology and include switches and routers for routing traffic between the compute nodes 30, 40 and 50. The group of networked compute nodes 20 may be a server-based network where security and maintenance are centralized with a network administrator 500. A network administrator 500 is responsible for maintaining and updating the group of compute nodes 20.

Each compute node 30, 40 and 50 has a baseboard management controller (BMC) 35. A BMC 35 is a specialized processor used for remotely monitoring and managing compute nodes. A BMC 35 monitors the physical state of the compute node. Corrective actions and updates can be made remotely through an administrative management application 100 in communication with the BMC 35. In addition to monitoring, compute nodes may be updated using the BMC 35.

Administrative management application 100 assists the network administrator 500. Administrative management application 100 assists the network administrator 500 with maintaining and updating the group of compute nodes 20. Administrative management application 100 provides the network administrator 500 with a browser based graphical user interface (GUI) or command line interface (CLI) to manage the maintenance and update the group of networked compute nodes 20 without having to physically interact with each compute node 30, 40 and 50. In addition, in some examples, administrative management application 100 may automatically take certain actions to maintain or update the compute nodes 20 based on logic programmed therein without relying on the direct input or intervention of the administrator to cause or guide the actions (although in some cases an administrator may be able to override and/or indirectly control such actions through adjusting settings or otherwise configuring the administrative management application 100).

Update package 400 may be remotely installed by administrative management application 100 (e.g., under the direction of the network administrator 500) without requiring the network administrator 500 to physically interact with each compute node 30, 40 and 50. Update package 400 may include multiple update components such as firmware updates, antivirus, antispyware, operating system updates, profile updates, software updates, patch binaries, and plug-ins. Firmware updates ("flashing the ROM") are a part of regular compute node (server) maintenance. Regular updates keep the compute nodes performing optimally. Firmware update components may provide critical problem fixes that ensure system stability, such as upgrades that may prevent server unresponsiveness. The update package may correct product issues such as ROM or processor functionality and improve compute node performance.

The network administrator 500 may schedule the installation of an update package 400 for a group of compute nodes 20 using the administrative management application 100. Or in some examples the administrative management application 100 may schedule the installation of the update package 400 with or without input from the network administrator 500. As each compute node 30, 40 and 50 is updated with one or more update components of the update package 400, a metadata store 200 stores and maintains historical metadata for each update component installed and metadata for compute nodes updated (and/or for individual devices within the compute nodes that are updated).

Historical update component data includes update component type, update component size, update component duration and type of device updated. The update component type is information about how the update component is installed, such as whether the update component installation is performed by a runtime agent, the BMC, or software interface. The type of device being updated may be, for example, a disk drive, a solid-state drive (SSD), a PCI card, a network card (NIC), an expander, or other type of device. The update component type, type of device updated, and update component size may be parsed from the update component and update package metadata and stored in the metadata store 200. The metadata store 200 receives a log from the BMC of a compute node of when installation of an update component was initiated and when it was completed (update duration). The metadata store 200 maintains the log and the update duration as historical update data for the updated compute nodes.

As noted above, the metadata store 200 also maintains historical compute node metadata for information about the compute node that has been updated. The historical compute node metadata includes data specifying the operating system (type and/or version number), baseboard management controller (type and/or version number), software interface between the operating system and firmware (type and/or version number), and generation for each compute node. The operating system may be, for example, Linux, Windows (e.g., Windows 7, 10, 11, etc.), a virtual operating system (e.g., VMWare, Docker, or other virtualization platform), or other operating systems. The software interface between the operating system and firmware may be UEFI, BIOS, both UEFI or BIOS, or any other low-level software. A variety of other update component metadata and compute node metadata may also be stored in the metadata store 200.

The metadata store 200 may be maintained by the administrative management application 100 or may be maintained separately. The metadata store 200 comprises historical update metadata (corresponding to the updated features described above) and historical compute node metadata (corresponding to the compute node features described above). The historical update metadata and historical compute node metadata include features and information linked to historical deployments of updates to firmware and software.

Prediction engine 300 utilizes a data set from historical update metadata and historical compute node metadata from the metadata store 200 to train a duration prediction model. The duration prediction model may be trained in a machine learning development environment. An exemplary machine learning development environment that may be utilized to train the duration prediction model has a master, one or more agents and a trial runner. The master, agents and trial runner may reside on a single computer server or may be distributed across computer servers in a cloud-computing environment.

The master is the central component and may be responsible for storing experiments, trials, and workload metadata from the metadata store 200. The master schedules and dispatches work to agents. The master may also be responsible for managing and deprovisioning agents in a cloud environment. The master may advance the experiment, trial, and workload state machines over time.

An agent manages a number of slots, which are computing devices, typically central processing units (CPU) or graphics processing units (GPU). An agent has no state and only communicates with the master. Each agent is responsible for discovering local computing devices (slots) and sending metadata about them to the master. The agent runs the workloads that are requested by the master. The agent monitors containers and sending information about them to the master.

The trial runner runs a trial in a containerized environment. The trial runners are expected to have access to the data that will be used in training. The agents are responsible for reporting the states of trial runner to the master. The machine learning development environment is prepared by determining the CPU and GPU containers to be used for training the models. The containers may be default containers or may be customized.

The machine learning environment described above is one example of a machine learning environment in which the duration prediction model of the prediction engine 300 may be trained, but it should be understood that any other desired machine learning environment may be used.

The data for use for training the machine learning model, in this case data from the historical metadata store 200, is prepared and loaded for model development. The data may be added directly to the same directory as code for the machine learning model. The data may be uploaded as part of an experiment directory, such as a training API implementation. The data may also be available using a distributed file system, to allow a cluster of machines to access the shared data set. The data may also be made available as object stores that manage data in a collection of key-value pairs.

Model training code may be converted to leverage APIs in the machine learning development environment. Hyperparameter tuning is performed to select the data, features, model architecture and learning algorithm to yield a duration prediction model.

Figure 2:
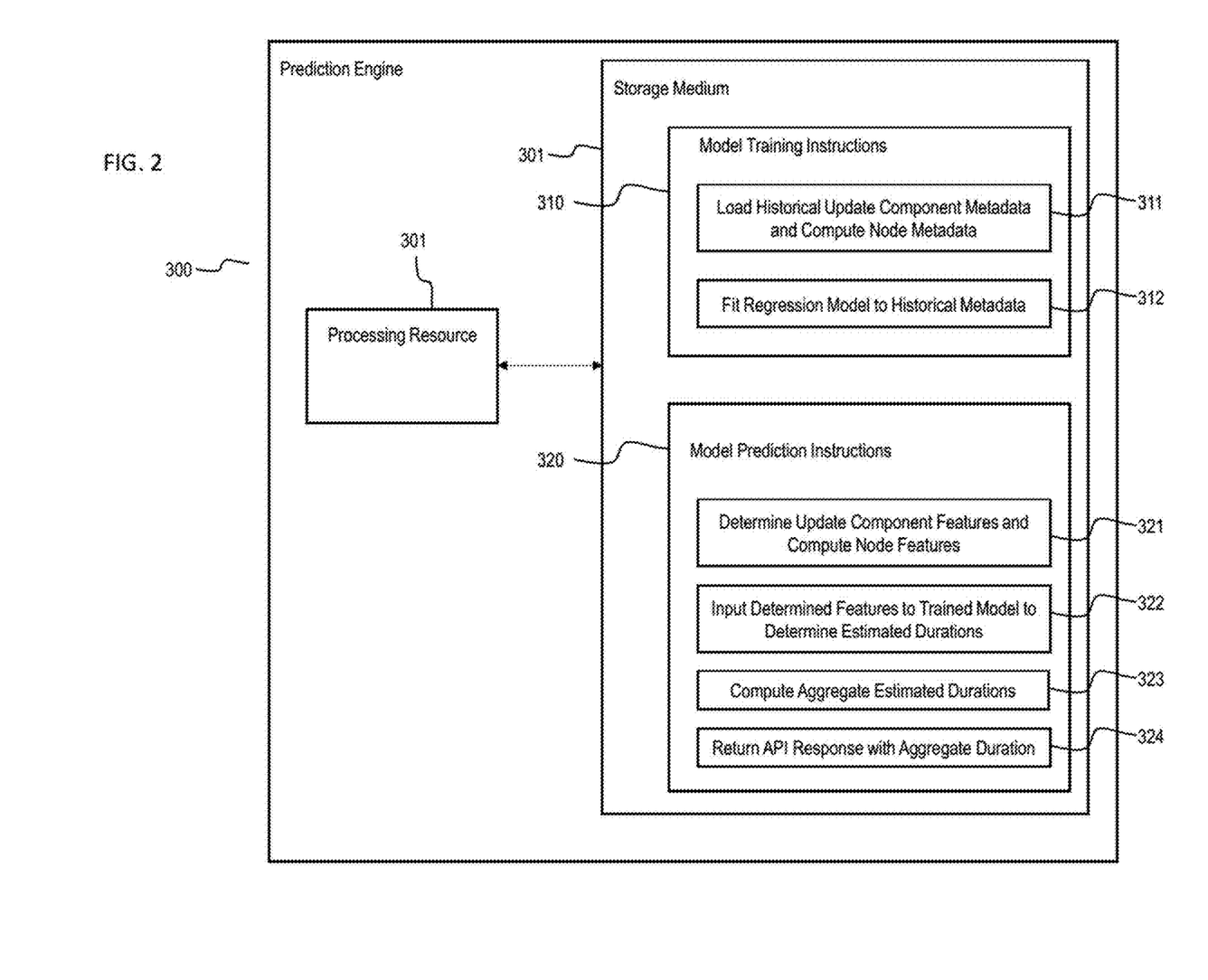
FIG. 2 is a block diagram illustrating a prediction engine in accordance with examples set forth herein.

FIG. 2 illustrates one example of the prediction engine 300 in greater detail. As shown in FIG. 2, the prediction engine 300 comprises a processing resource 301 (e.g., a processor, CPU, GPU, SoC, or other processing resource), and a storage medium 301 (e.g., a non-transitory computer readable medium). The storage medium 301 comprises model training instructions 310 and model prediction instructions 320. The model training instructions 310 are executable to cause a prediction model to be trained, whereas model prediction instructions 320 are executable after training of the model to use the trained model to predict durations of pending updates. Although the model training instructions 310 and model prediction instructions 320 are shown in FIG. 2 together as part of the same storage medium 301 for ease of description, in some examples these may be provided separately. For example, the prediction engine 300 may comprise multiple computing systems, including one or more systems used for training the duration prediction model and one or more systems that receive the trained duration prediction model and use the model for predicting durations of updates. In some examples, the system(s) used for training may have the model training instructions 310 but not the model prediction instructions 320, while conversely the system(s) used for predicting may have the model prediction instructions 320 but not the model training instructions 310. In other examples, the prediction engine 300 may comprise one or more computing systems that comprise both the model training instructions 310 and model prediction instructions 320 and in such examples the same computing system may be used for both training the model and using the model to predict durations of updates.

The model training instructions 310 include instructions 311 to load historical update component metadata and compute node metadata from the metadata store 200. The model training instructions 310 also comprise instructions 312 to fit a regression model to the historical metadata. More specifically, in the example illustrated in FIG. 2, the duration prediction model comprises a learning regression algorithm. A regression is a function that mathematically relates independent variables (selected features) to a dependent variable (the duration). The function may have coefficients (weights or constants) for each independent variable (feature) and fitting the regression model to the historical data per instructions 312 may comprise determining values for the coefficients that produce results that most closely fit the historical training data. For example, an error function may be used to characterize how close a given set of coefficients gets to the correct value, and then the best coefficients may be determined by minimizing the error function. In other words, the coefficients are those that produce the smallest error when the training data is used.

More specifically, in some examples the regression utilized by the prediction engine 300 is a gradient boosting regression algorithm. The gradient boosting regression algorithm produces predictive models from an ensemble of weak predictive models. The gradient boosting regression algorithm can be used for regression and classification problems. An example of such a gradient boosting regression algorithm that may be used for the duration prediction model is the XGBRegressor algorithm. The XGBRegressor algorithm may be used for both feature selection and training. That is, during successive training processes features that have low relevance may be omitted from the regression to simplify future training and prediction. Repeated k-fold cross-validation can be used to improve the estimated performance of the machine learning model.

In some examples, some of the data from the metadata store 200 may be used for training and other data may be used for testing and validation. In one example, 80% of the data set used from the metadata store 200 may be used for training the gradient boosting regression algorithm and the remaining 20% may be used for testing duration update results from the predictive model.

In the examples in which the prediction engine 300 uses a gradient boosting regression algorithm, the fitting of instructions 312 may comprise fitting multiple regression models to the metadata to determine the relationship between a single predictor value (feature) and the response variable (duration) when other predictor values are held fixed. Each regression model is able to show whether changes observed in the dependent variable (duration) are associated with changes in one or more of the explanatory (independent) variables (features). The equation can be expressed as $$Y = b_0 + b_1 x_1 + b_2 x_2 + \ldots \qquad \text{(equation 1)}$$

where y is the dependent variable, $x_1$, $x_2$, . . . are the explanatory variables, and $b_1$, $b_2$ . . . are the coefficients. The coefficients ($b_1$, $b_2$ . . . ) explain the correlation of the explanatory variable with the dependent variable. The sign of the coefficients (+/−) designates whether the variable is positively or negatively correlated.

In some examples, the prediction engine 300 visualizes the results for each regression model. The test set deviance is computed by using Mean Absolute Error (MAE) Metric. Mean Absolute Error is a model evaluation metric used with regression models. The mean absolute error of a model with respect to a test set is the mean of the absolute values of the individual prediction errors on over all instances in the test set, which in mathematical notation may be given by the following formula:

$$MAE = \frac{\sum_{i=1}^{n} |y_i - x_i|}{n} \qquad \text{(equation 2)}$$

with MAE being the mean absolute error, $y_i$ being the prediction for an $i^{th}$ data point (e.g., the predicted duration for an $i^{th}$ update), $x_i$ being the true value for the $i^{th}$ data point (e.g., the actual duration for the $i^{th}$ update), and n being the total number of data points (e.g., the total number of updates used for the testing).

Figure 5:
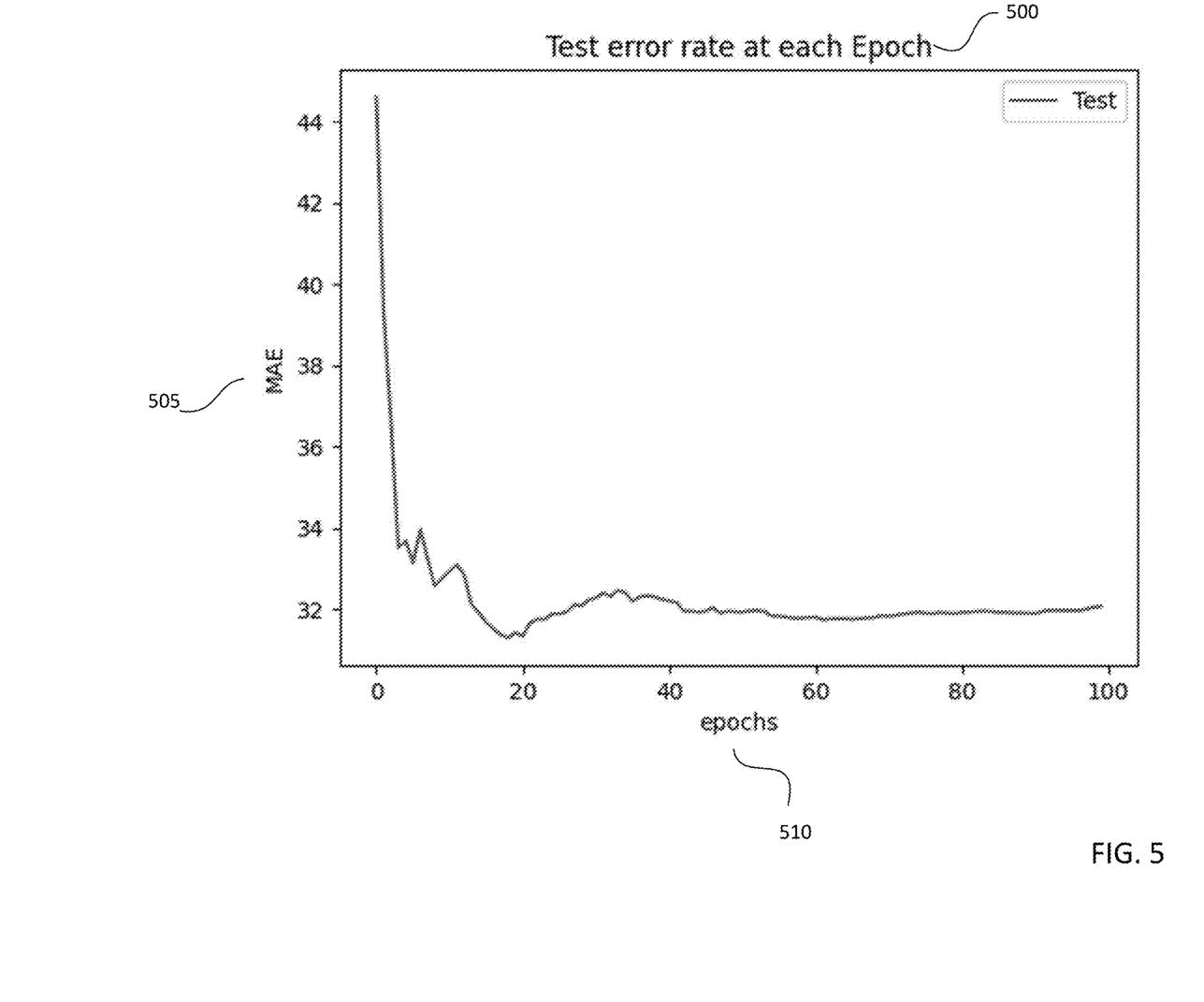
FIG. 5 is a diagram of test error rate for the predictive algorithm in accordance with examples set forth herein.

FIG. 5 depicts a graph 500 of the test error rate (MAE) 505 at each epoch 510. The test set deviance is plotted against boosting iterations. Iterations are the number of batches needed to complete an epoch 510. An epoch 510 is the number of times the algorithm scans the entire data set. As shown in FIG. 5, in one example the MAE generally declined as more epochs were run until the MAE eventually leveled out at an approximately steady value of about 32.

Figure 6:
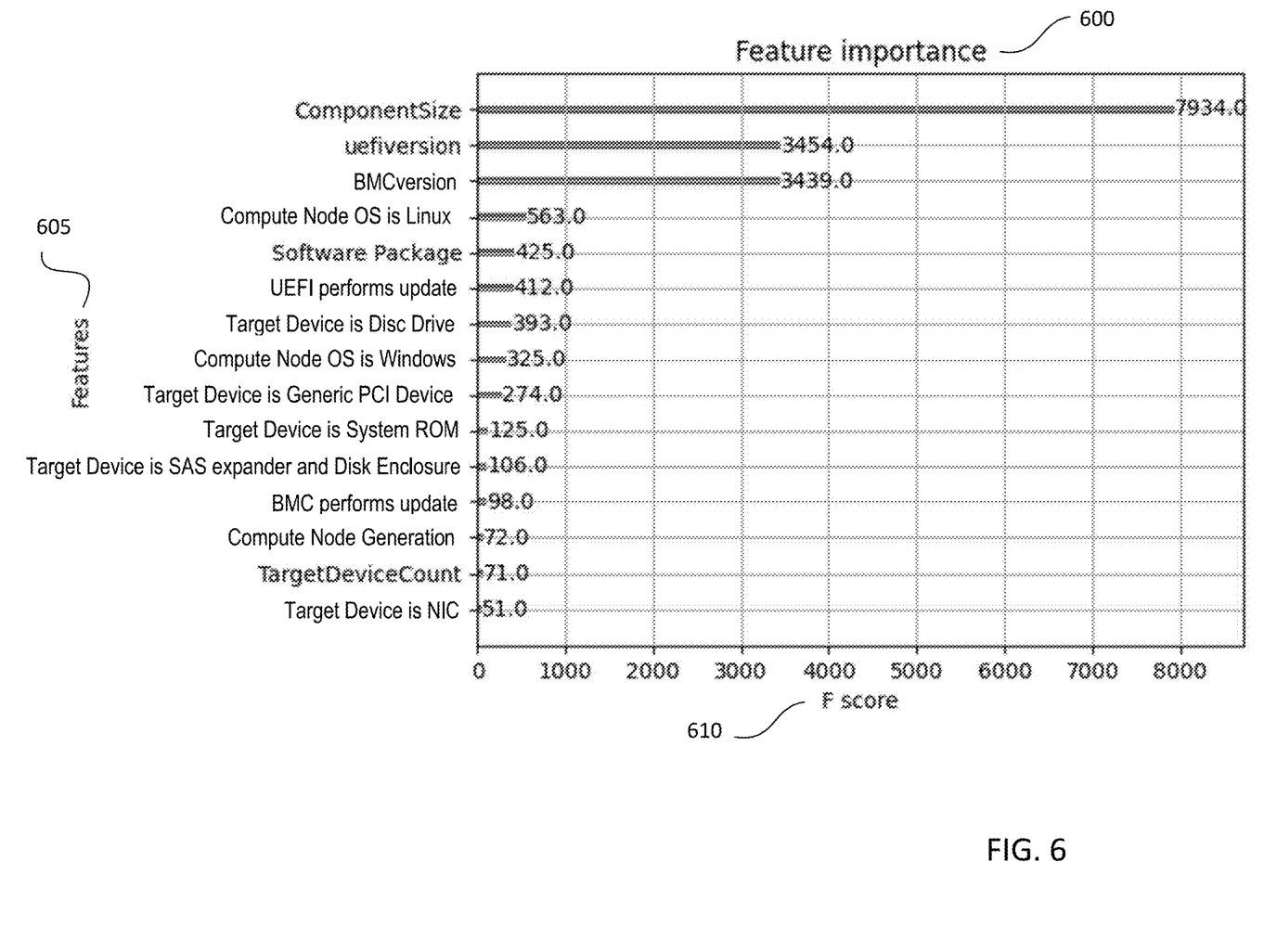
FIG. 6 is a diagram of feature importance using the predictive algorithm in accordance with examples set forth herein.

As the XGBRegressor algorithm uses an ensemble of predictive models, the feature importance may be plotted. The more predictive features are separated from the less predictive features. Less predictive features may be removed from the model for further training and/or for later use in model predictions. For example, two different linear regression methods may identify the same two strongly predictive features but not in the same order.

FIG. 6 depicts a plot 600 of the feature importance. In some examples, feature importance 605 is plotted using xgboost. Xgboost is a program that can be used in conjunction with the XGBRegressor algorithm. One function of the xgboost is to determine feature importance of a set of features being used to train a model. Feature importance provides a score 610 indicating how useful a feature is within the model. Feature importance may be calculated by the amount that each feature split point improves the performance measure, weighted by the number of observations the node is responsible for. In an example, the performance measure may be the purity (Gini index) used to select the split points or another more specific error function.

In some examples, a user may determine when the model is sufficiently trained based on the tested error or deviance, for example with the aid of the aforementioned plot of test set deviance. In other examples, the prediction engine 300 may be configured with logic to identify when the model is sufficiently trained. For example, when the test error rate is equal to or lower than a threshold (or equal to or lower than the threshold consistently for a defined number of test runs, to account for variances in the error), the prediction engine 300 may identify the model as being sufficiently trained.

In some examples, a user may designate which features should be removed, for example with the aid of the aforementioned plot of feature importance. In other examples, the prediction engine 300 may be configured with logic to select which features to remove. For example, all features that have a relevance less than a defined relevance threshold may be omitted.

In one example, the features for each compute node that were strongly predictive of duration are operating system, baseboard management controller, software interface between the operating system and firmware, generation for each compute node and number of devices having the same baseboard management controller, software interface and generation. The features for update components that were strongly prediction of duration are update component type, update component size, and type of device updated. Coefficients (weights or constants) are applied to each feature to explain the correlation of the feature with the dependent variable (duration).

The update duration model's performance is compared to the actual performance of a percentage of the data set (e.g., 20%). The actual update durations are compared to the predicted update durations generated by the duration prediction model. The comparison validates the model's performance.

Referring again to FIG. 1, when new update components, typically as part of an update package 400, are to be deployed to compute nodes 30, 40 and 50 in a large-scale computer deployment, deployment time is predicted by the trained duration prediction model using the prediction engine 300.

The administrative management application 100 makes a representational state transfer (REST) application programming interface (API) call to the prediction engine 300. The payload of the REST API call includes metadata for the update component type and update component size for each update component to be installed and also information specifying the type of device being updated by the update component.

In response to the API call, the model prediction instructions 320 are executed. The model prediction instructions 320 comprise instructions 321 to determine update component features for the updates that are to be applied and compute node features for the devices that are to be updated. This information is determined from the metadata specified in the API call. For example, prediction engine 300 determines which compute nodes are to be updated by one or more of the multiple update components. A single compute node may have multiple different devices and be updated with multiple different update components. In some examples, a single compute node may have multiple of the same devices to be updated by the same update component.

In an example, with reference to FIG. 1, suppose that a hypothetical update package 400 comprises a first update component for updating storage drives and a second update component for updating GPUs. In that case, the payload of the REST API call includes metadata reflective of the two update components, such as metadata identifying the update component type of update (whether the component is to be installed by BMC, UEFI, a runtime agent, or some other device), the type of device the update component is for, and the size of the update component. The payload of the REST API call may also indicate which compute nodes are to be updated, and the prediction engine 300 determines from metadata store 200 information about the compute nodes to be updated. For example, if it is supposed that compute nodes 30 and 40 are to be updated with the first update component while nodes 40 and 50 are to be updated with the second update component, the prediction engine 300 may determine the number of storage drives for compute node 30 and compute node 40 to be updated by the first update component and the number of GPUs for compute node 40 and compute node 50 to be updated by the second update component. In addition, the prediction engine 300 may access other compute node data for the compute nodes 30, 40 and 50 from the metadata store 200 that can be used by the prediction engine for prediction. For example, the compute node data may include data specifying, for each of the compute nodes 30, 40, and 50: the operating system, baseboard management controller version, version of the software interface between the operating system and firmware (e.g., UEFI), and/or compute node generation.

The model prediction instructions 320 further comprise instructions 322 to input the determined update component features and compute node features into the trained model to determine estimated durations. In other words, the update metadata from the payload of the REST API for each update component, the number of devices on each compute node being updated and compute node metadata from the metadata store for each compute node to be updated are loaded into the trained duration prediction model to generate a predicted update duration for each update component. The inputting and computing may be performed for each update component to be installed to determine an estimated duration for that component. In some examples, the inputting and computing of 322 may be performed for each unique combination of update component and device to be updated. When multiple similar components (e.g., SSDs all having similar compute node metadata) are to be updated with the same update component, these may be grouped together for duration estimation purposes, whereas updates being applied to devices having different compute node metadata may have separate duration estimates made.

The model prediction instructions 320 further comprise instructions 323 to calculate an aggregated predicted duration (deployment time) for installation of the multiple update components of an update package by summing the individual predicted durations. The aggregated predicted duration is the total predicted maintenance time window for completing installation of the upgrade components.

Figure 7:
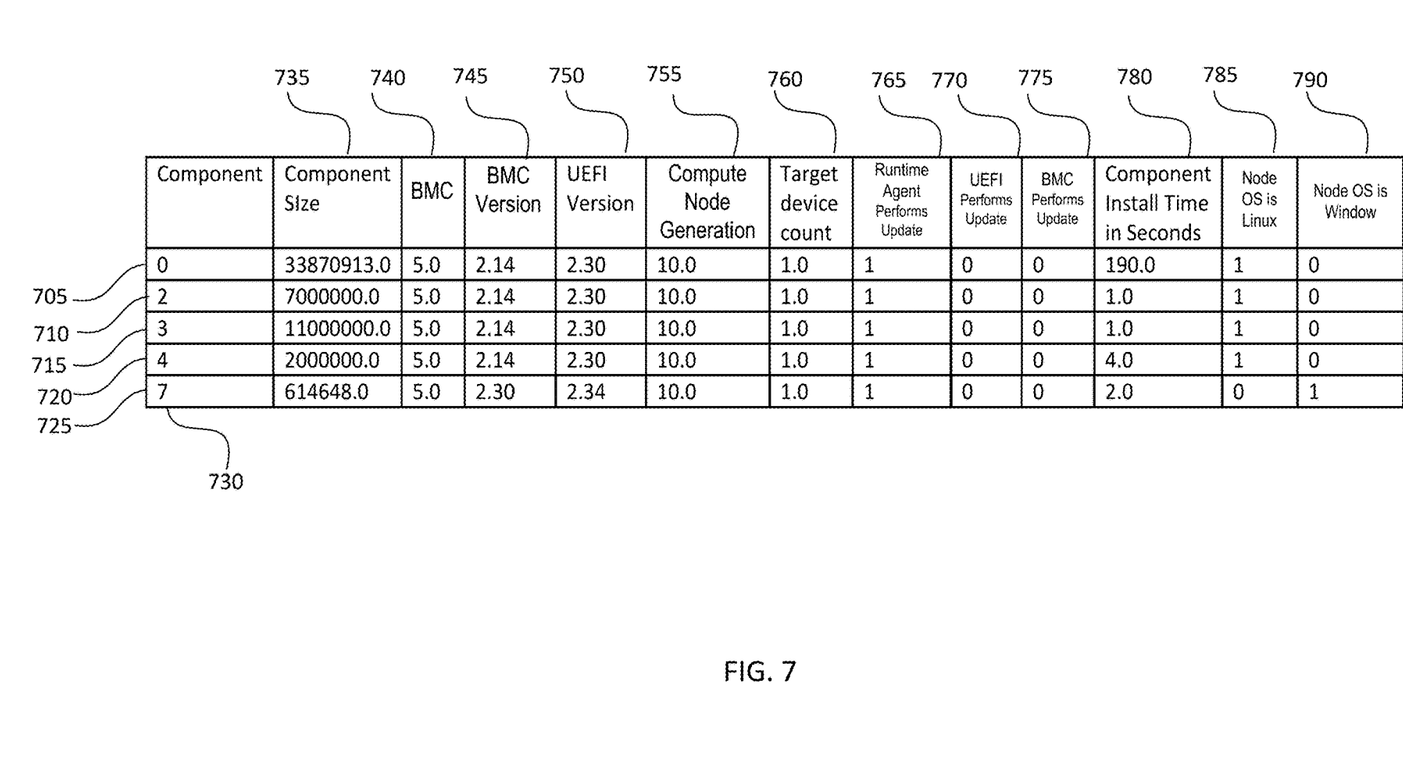
FIG. 7 is a diagram of the duration prediction model in accordance with examples set forth herein.

In another example, as shown in FIG. 7, an example table 700 for update metadata and historical compute node metadata for an update package of update components 705 is provided. The table 700 reflects metadata for a hypothetical update package and hypothetical compute nodes, which have been selected to aid understanding, but it should be understood that the particular values indicated in table 700 are just examples and are not limiting. The example update package includes five different update components 705, 710, 715, 720 and 725 (e.g., 0, 2, 3, 4 and 7). is provided. For each compute node, the update metadata and historical compute node data is determined by prediction engine 300 of FIG. 1. The update metadata for update features includes update component type, which refers to the type of device that will install the update component for the compute node. For example, in table 700 the columns runtime agent performs update 765, UEFI performs update 770, and BMC performs update 775 indicate the update component type for each update component. The update metadata for update features also includes update component size 735 and update component install time 780 (e.g., duration).

The historical compute node metadata for features comprises the operating system of the compute node, as indicated by the columns Linux 785 or Windows 790, BMC type 740, BMC version 745, UEFI version 750, and compute node generation 755. Prediction engine 300 of FIG. 1 also determines the number of devices (target device amount 760) per compute node to be updated with an update component 705 as shown in FIG. 7. In the hypothetical example of FIG. 7, the four update components 705, 710, 715, and 720 are all to be installed on a first compute node, and the first compute node has one target device per update component as indicated in the target device count 760 column. On the other hand, in this hypothetical example the update component 7 is for a second compute node, and the prediction engine 300 determines the second compute node has a single device to be updated with a single update component 730 (7). It should be understood that practice, some compute nodes could have multiple devices to be updated by a given update component.

In the example of FIG. 7, first compute node has a Linux operating system, BMC type 5.0 version 2.14, UEFI type/version of 2.34 and is a generation 10 compute node. Second compute has a Windows operating system, BMC type 5.0 version 2.30 and is a generation 10 compute node.

The update metadata and compute node data are utilized to determine the predicted update duration each update component. The predicted update duration for update component 710 (0) is 190 seconds, the predicted update duration for update component 715 (2) is one second, the predicted update duration for update component 720 (3) is one second, and the predicted update duration for update component 725 (4) is four seconds. The predicted update duration for update component 710 (7) is two seconds. The predicted durations for components 710. 715, 720, 725 and 730 0, 2, 3, 4 and 7 are summed (190+1+1+4+2) to calculate the aggregated predicted duration for the update package of 198 seconds.

Referring again to FIG. 2, after the aggregated predicted update duration is determined, an API response with the aggregated prediction update duration is formatted. The model prediction instructions 320 comprise instructions 324 to return an API response with the aggregate duration. The aggregated predicted update duration is formatted to be returned to the administrative management application 100 in response to receiving the application call from the administrative management application 100. Using the request headers from the REST API call, the system generates and formats the aggregated predicted duration and returns the data to the administrative management application. The aggregated predicted duration is communicated to the administrative management application 100 and network administrator 500. The remote installation of the update package for the compute nodes to be updated in the large-scale computer deployment is scheduled based on the aggregated predicted update duration.

Figure 3:
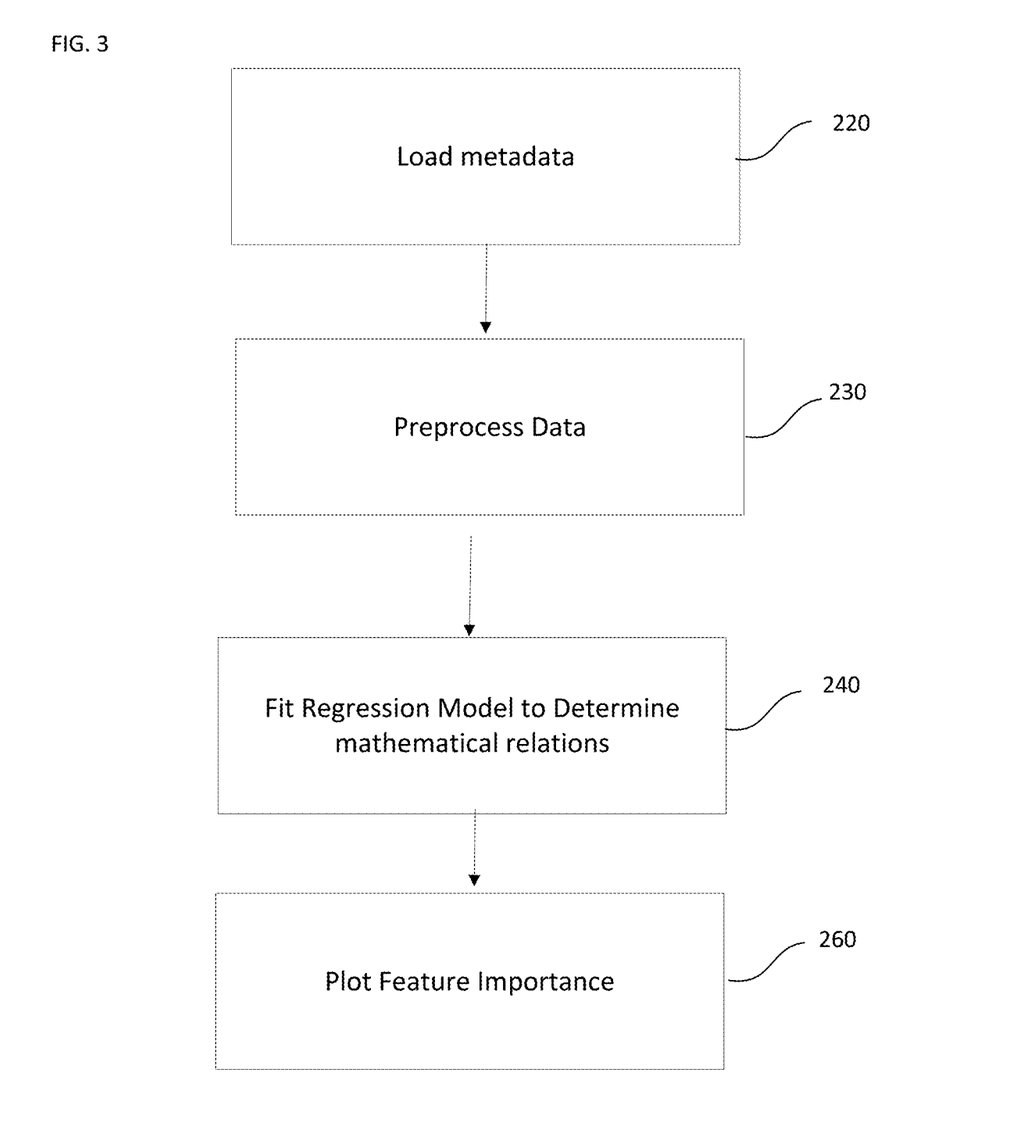
FIG. 3 is a flow diagram for a method for training an update duration prediction model in accordance with examples set forth herein.

FIG. 3 is a flow diagram illustrating a method for training an update duration prediction model in accordance with examples set forth herein. The method may be performed by any suitable processor or other hardware discussed herein, for example, a processor or hardware included in prediction engine 300. In particular, in some examples, the prediction engine 300 or components thereof are instantiated by one or more processors executing machine readable instructions that comprise, at least in part, instructions corresponding to the operations of the method of FIG. 3.

At block 220 metadata from the metadata store 200 may be loaded for use by prediction engine 300. The metadata may comprise historical update metadata and compute metadata.

At block 230 the metadata is preprocessed by the prediction engine for use with a machine learning algorithm. The data is preprocessed by formatting for the prediction engine, checking for completeness and bias, checking for and imputing missing values, and/or smoothing and binning the metadata. Additional preprocessing of the data may be performed by converting categorical features to numerical features.

At block 240, the prediction engine 300 fits the preprocessed metadata to a machine learning regression algorithm. The regression algorithm may comprise one or more regression functions, which comprises a function that mathematically relates independent variables (selected features) to a dependent variable (the duration). The form of the regression function depends on the type of regression being used (in a linear regression, the independent variables may be linearly related to the dependent variable, in a polynomial regression the independent variables may be related in polynomial form to the dependent variable, and so on). The regression function may have coefficients (weights or constants) for each independent variable (feature) and fitting the regression model to the historical update and compute node data comprises determining values for the coefficients that produce acceptable errors. More specifically, fitting the regression model to the historical update and compute node data comprises feeding training data, which comprises compute node metadata and the update metadata, as inputs into the machine learning regression model, evaluating the regression function to determine a predicted duration based on the training data, comparing the predicted duration to a known duration, determining if the difference between the predicted duration and the known duration (the error) is less than the threshold error, and if the error is not less than the threshold error changing the coefficients and repeating the process again. In this manner, the coefficients are iteratively changed until a set of values that produces an error that is less than the threshold is identified. Once this set of coefficient values is identified, the model may be regarded as trained and those values can be used in the function for future predictions. In some cases, the threshold level of error that is acceptable may be user defined or predefined by prediction engine 300. Various different approaches to varying the coefficients may be used during the fitting to reduce the time it takes to converge on suitable values and to increase accuracy, as would be familiar to those of ordinary skill in the art. For example, the XGBRegressor algorithm uses a distributed gradient-boosted decision tree to converge on coefficients. Other example regression models may include multiple linear regression, polynomial regression, robust regression, decision tree, random forest, Gaussian process regression, support vector regression and combinations thereof. The fitting of the data to the regression algorithm may also be described as determining mathematical relationships between the update durations and the one or more of the update features and compute node features.

At block 260, the prediction engine 300 determines feature importance. As the XGBRegressor algorithm uses an ensemble of predictive models, the feature importance is plotted. The prediction engine 300 determines which of the update features and compute node features satisfy a threshold of relevance and are predictive features of update duration based on the determined mathematical relationships. determine which of the update features and compute node features satisfy a threshold of relevance and are predictive features of update duration based on the determined mathematical relationships.

Utilizing the blocks of FIG. 2, a trained regression model is generated comprising the predictive features as independent variables and update duration as a dependent variable, and coefficients respectively assigned to the predictive features. The trained regression model can be utilized for predicting update duration as described in FIG. 4.

Figure 4:
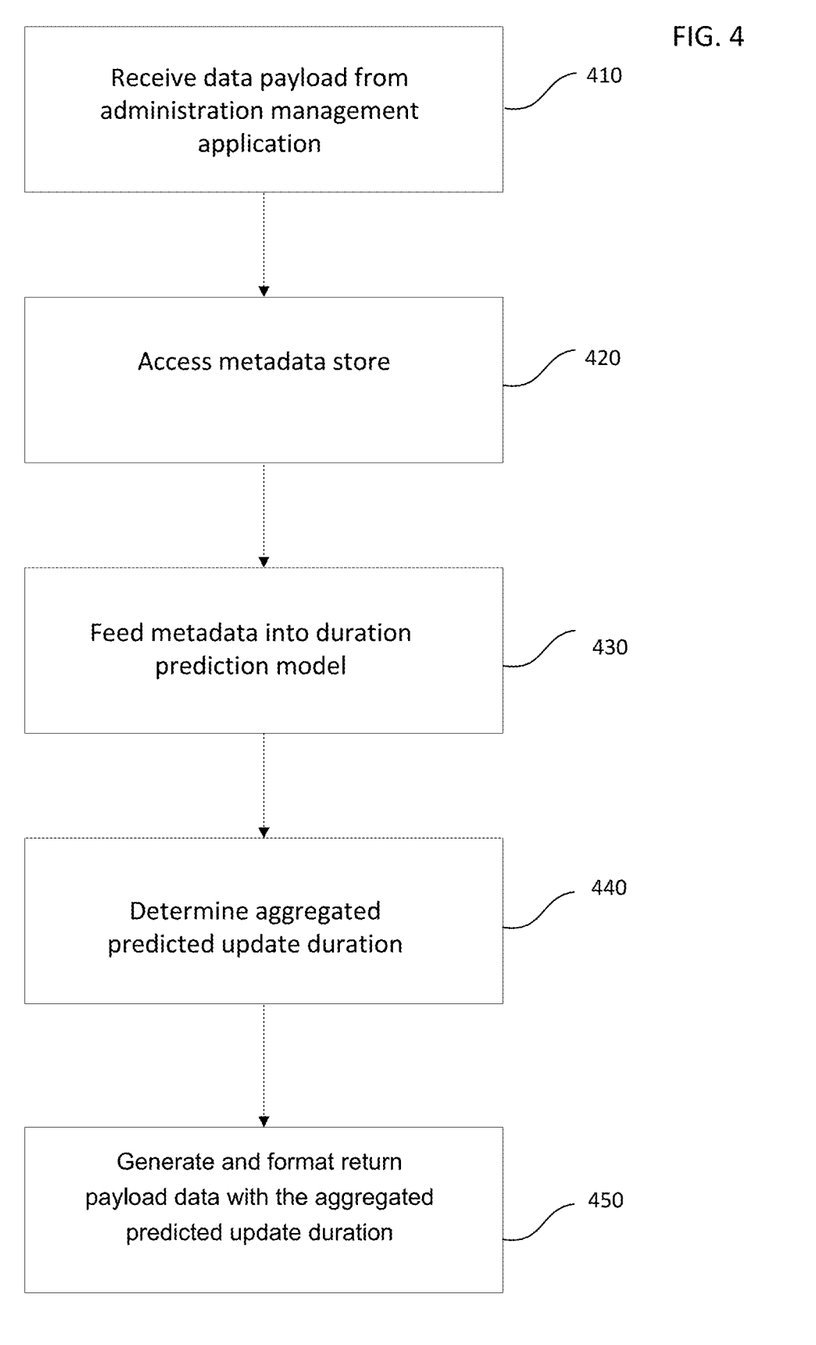
FIG. 4 is a flow diagram of a method for generating an aggregated update prediction duration in accordance with examples set forth herein.

FIG. 4 is a flow diagram illustrating a method for predicting update duration in accordance with examples set forth herein. The method may be performed by any suitable processor or other hardware discussed herein, for example, a processor or hardware included in prediction engine 300. In particular, in some examples, the prediction engine 300 or components thereof are instantiated by one or more processors executing machine readable instructions that comprise, at least in part, instructions corresponding to the operations of the method of FIG. 4.

A method starts in block 410, in which the prediction engine 300 receives a data payload of update metadata for each of a plurality of update components to be installed on compute nodes of a system. The update metadata includes the type of update component, size of update component and type of compute node to be updated.

In block 420, the prediction engine 300 determines compute node metadata for each of the compute nodes to be updated. The compute node metadata is accessed from metadata store 200.

In block 430, the prediction engine 300 determines a predicted update duration for each of the plurality of update components. The compute node metadata and the update metadata are fed as inputs into the duration prediction model generated by prediction engine 300. As described above, the duration prediction model is a function that relates compute node features and update features as independent variables to predict update durations as an output.

In block 440, the prediction engine 300 aggregates the predicted update durations for each of the plurality of update components to generate an aggregated predicted update duration for the plurality of updates.

In block 450, the prediction engine 300 generates and formats return payload data with the aggregated predicted update duration. The prediction engine 300 may communicate the predicted update duration with the administration management application 100 which may in turn communicate the predicted update duration with the network administrator 500 for use in scheduling the update package installation.

The methods, systems, devices, and equipment described herein may be implemented with, contain, or be executed by one or more computer systems. The methods described above may also be stored on a non-transitory computer-readable medium. Many of the elements may be, comprise, or include computers systems.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, blocks, operations, elements, and/or components but do not preclude the presence or addition of one or more other features, blocks, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Further modifications and alternative examples will be apparent to those of ordinary skill in the art in view of the disclosure herein. For example, the devices and methods may include additional components or blocks that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the disclosure herein. It is intended that the specification and examples be considered as exemplary only, with the following claims being entitled to their fullest breadth, including equivalents, under the applicable law.

The invention claimed is:

1. A system comprising:
   at least one computing device including at least one processor configured to:
   receive a data payload of update metadata for each update component of a plurality of update components to be installed on a plurality of compute nodes of a system, wherein the update metadata comprises a type of update component, a size of update component, and a type of device to be updated;
   determine compute node metadata for each compute node of the plurality of compute nodes to be updated;
   determine a predicted update duration for each update component of the plurality of update components by feeding the compute node metadata and the update metadata as inputs into a duration prediction model comprising a function that relates compute node features and update features as independent variables to predict update durations for the plurality of update components as outputs;
   aggregate the predicted update duration for each update component of the plurality of update components to generate an aggregated predicted update duration for the plurality of update components; and
   generate and format return payload data with the aggregated predicted update duration for the plurality of update components.

2. The system of claim 1, wherein the plurality of update components comprise updates made to one or more of: firmware, software, or drivers.

3. The system of claim 1, wherein the update metadata comprises the size and type of each update component of the plurality of update components.

4. The system of claim 3, wherein the type of update component comprises an indication of an installation method of the update component.

5. The system of claim 1, wherein the compute node metadata comprises, for each compute node of the plurality of compute nodes: an operating system of the compute node, a baseboard management controller version of the compute node, a software interface version of the compute node, a generation of the compute node, and a number of devices updated by an update component of the compute node.

6. The system of claim 1, wherein the duration prediction model is generated by training historical compute node metadata and historical update metadata for a plurality of updated compute nodes.

7. The system of claim 6, wherein the historical compute node metadata comprises data identifying an operating system, a baseboard management controller version, a software interface version, a generation, and a number of devices updated by an update component of each updated compute node of the plurality of updated compute nodes.

8. The system of claim 7, wherein the historical update metadata comprises a length of installation of an update, a type of an update, and a size of an update for each updated compute node of the plurality of updated compute nodes.

9. The system of claim 8, wherein the length of installation of the update is measured by a baseboard management controller of a compute node installing the update.

10. The system of claim 9, wherein the duration prediction model is an XGBRegressor algorithm trained with historical compute node metadata and historical update metadata for a plurality of updated compute nodes.

11. The system of claim 1, wherein the at least one computing device is further configured to cause each update of the plurality of updates to be installed for the plurality of compute nodes to be updated.

12. The system of claim 1, wherein the predicted update duration for each update component of the plurality of update components is a length to install each update of the plurality of updates to be installed for the plurality of compute nodes to be updated.

13. A method comprising:
   using at least one processor to:
   collect update metadata for each update component of a plurality of update components installed on a plurality of compute nodes of a system, wherein the update metadata comprises a plurality of update features and an update duration for each update component of the plurality of update components;
   collect compute node metadata for each compute node of the plurality of compute nodes being updated, wherein the compute node metadata comprises a plurality of compute node features;
   determine mathematical relationships between the update durations for the plurality of update components and one or more of the plurality of update features and the plurality of compute node features by feeding the update durations for the plurality of update components, the compute node metadata, and the update metadata as inputs into one or more machine learning regression models;
   determine which of the plurality of update features and the plurality of compute node features satisfy a threshold of relevance and are predictive features of the update duration for each update component of the plurality of update components based on the determined mathematical relationships; and
   generate a trained regression model comprising:

the predictive features of the update duration for each update component of the plurality of update components as independent variables and the update duration for each update component of the plurality of update components as a dependent variable, and coefficients respectively assigned to the predictive features of the update duration for each update component of the plurality of update components.

14. The method of claim 13, wherein the predictive features of the update duration for each update component of the plurality of update components comprise compute node metadata comprising data identifying an operating system, a baseboard management controller version, a software interface version, a generation, and a number of devices updated by an update component of each updated compute node of the plurality of updated compute nodes.

15. The method of claim 14, wherein the predictive features of the update duration for each update component of the plurality of update components comprise update metadata comprising a type of update and a size of update for each updated compute node of the plurality of updated compute nodes.

16. The method of claim 13, wherein the update duration for each update component of the plurality of update components is a length of installation of an update and is measured by a baseboard management controller of a compute node installing the update.

17. The method of claim 13, wherein the one or more machine learning regression models are an XGBRegressor algorithm.

18. A non-transitory computer-readable medium storing instructions executable by a processor to cause the processor to:
receive a data payload of update metadata for each update component of a plurality of update components to be installed on a plurality of compute nodes of a system, wherein the update metadata comprises a type of update component, a size of update component, and a type of device to be updated;
determine compute node metadata for each compute node of the plurality of compute nodes to be updated;
determine a predicted update duration for each update component of the plurality of update components by feeding the compute node metadata and the update metadata as inputs into a duration prediction model comprising a function that relates compute node features and update features as independent variables to predict update durations for the plurality of update components as outputs;
aggregate the predicted update duration for each update component of the plurality of update components to generate an aggregated predicted update duration for the plurality of update components; and
generate and format return payload data with the aggregated predicted update duration for the plurality of update components.

19. The non-transitory computer-readable medium of claim 18, wherein the compute node metadata comprises, for each compute node of the plurality of compute nodes: an operating system of the compute node, a baseboard management controller version of the compute node, a software interface version of the compute node, a generation of the compute node, and a number of devices updated by an update component of the compute node.

20. The non-transitory computer-readable medium of claim 18, wherein the duration prediction model is generated by training historical compute node metadata and historical update metadata for a plurality of updated compute nodes.

* * * * *